United States Patent
Lee et al.

(10) Patent No.: US 7,898,640 B2
(45) Date of Patent: Mar. 1, 2011

(54) APPARATUS FOR TRANSFERRING LIQUID CRYSTAL DISPLAY PANEL

(75) Inventors: Jeong-Joon Lee, Incheon (KR); Jeong-Ho Lee, Gyeonggi-Do (KR)

(73) Assignee: LG Display Co., Ltd., Seoul (KR)

( * ) Notice: Subject to any disclaimer, the term of this patent is extended or adjusted under 35 U.S.C. 154(b) by 613 days.

(21) Appl. No.: 11/478,377

(22) Filed: Jun. 30, 2006

(65) Prior Publication Data
US 2007/0153217 A1 Jul. 5, 2007

(30) Foreign Application Priority Data
Dec. 29, 2005 (KR) .................. 10-2005-0134588

(51) Int. Cl.
*G02F 1/13* (2006.01)
*G02F 1/1333* (2006.01)
(52) U.S. Cl. ............................ 349/187; 349/158
(58) Field of Classification Search ......... 349/187, 349/158; 248/309.1, 309.3, 274.1, 917, 924, 248/683, 684
See application file for complete search history.

(56) References Cited

U.S. PATENT DOCUMENTS

| | | | |
|---|---|---|---|
| 6,774,978 B2 * | 8/2004 | Shin | 349/187 |
| 7,414,603 B2 * | 8/2008 | Tseng | 345/87 |
| 7,450,213 B2 * | 11/2008 | Kim et al. | 349/187 |
| 2003/0178866 A1 * | 9/2003 | Chae et al. | 294/119.1 |
| 2003/0223030 A1 * | 12/2003 | Byun et al. | 349/187 |
| 2006/0285063 A1 * | 12/2006 | Jo et al. | 349/187 |
| 2007/0044606 A1 * | 3/2007 | Kang et al. | 83/13 |

FOREIGN PATENT DOCUMENTS

KR 1020060133382 12/2006

* cited by examiner

*Primary Examiner*—Uyen-Chau N Le
*Assistant Examiner*—John M Bedtelyon
(74) *Attorney, Agent, or Firm*—McKenna Long & Aldridge LLP

(57) ABSTRACT

A liquid crystal display panel transferring apparatus capable of transferring a liquid crystal display (LCD) panels with various models, the apparatus including a first main body to affix a liquid crystal display (LCD) panel formed on a substrate; and at least one second main body extendable from the first main body to adjust an area to affix the LCD panel; a third main body extendable from the second main body. The transferring apparatus may include an impact applying unit formed at the third main body to apply an impact to the substrate at an outer periphery of the LCD panel.

5 Claims, 4 Drawing Sheets

APPARATUS FOR TRANSFERRING LIQUID CRYSTAL DISPLAY PANEL

This application claims the benefit of Korean Patent Application No. 10-2005-134588, filed in Dec. 29, 2005, which is hereby incorporated by reference for all purposes as if fully set forth herein. This application incorporates by reference co-pending application, Ser. No. 10/184,096, filed on Jun. 28, 2002 entitled "SYSTEM AND METHOD FOR MANUFACTURING LIQUID CRYSTAL DISPLAY DEVICES FROM LARGE MOTHER SUBSTRATE PANELS"; and co-pending application, Ser. No. 11/476,919, now U.S. Pat. No. 7,450,213, filed on Jun. 29, 2006, entitled "METHODS OF MANUFACTURING LIQUID CRYSTAL DISPLAY DEVICES" for all purposes as if fully set forth herein.

BACKGROUND OF THE INVENTION

1. Field of the Invention

The present invention relates to an apparatus for transferring a liquid crystal display (LCD) panel, and particularly, to an apparatus for transferring an LCD panel for facilitating a transfer of LCD panels of a variety of models.

2. Discussion of the Related Art

A Liquid Crystal Display (LCD) device is a type of display device for displaying images by adjusting the optical transmissivity of individual liquid crystal cells arranged in a matrix using image information supplied as a data signal to the liquid crystal cells.

A typical LCD device includes an LCD panel in which the liquid crystal cells are arranged in a matrix form and driver integrated circuits (ICs) for driving the liquid crystal cells in the LCD panel.

The LCD panel includes a color filter substrate and a thin film transistor array substrate that face each other and a liquid crystal layer disposed between the color filter substrate and the thin film transistor array substrate.

On the thin film transistor array substrate of the LCD panel, a plurality of data lines for transmitting data signals supplied from a data driver integrated circuit to the liquid crystal cells are arranged perpendicular to a plurality of gate lines for transmitting scan signals supplied from a gate driver integrated circuit to the liquid crystal cells. The liquid crystal cells are arranged in areas defined by crossings of the data lines and the gate lines.

The gate driver integrated circuit supplies the scan signals to the plurality of gate lines sequentially so that lines of the liquid crystal cells can be sequentially selected line by line. The data driver integrated circuit supplies data signals to the liquid crystal cells of the selected line through the plurality of data lines.

A common electrode and a pixel electrode are respectively formed at the inner sides of the color filter substrate and the thin film transistor array substrate facing to each other for applying an electric field to the liquid crystal layer. A pixel electrode is formed on the thin film transistor array substrate for each liquid crystal cell. A single common electrode is integrally formed on an entire surface of the color filter substrate. Accordingly, the light-transmittance of each of the liquid crystal cells can be individually controlled by controlling a voltage applied to the particular pixel electrode while a voltage is applied to the common electrode.

A thin film transistor is formed at the respective liquid crystal cells to be used as a switching device to control the voltage applied to the pixel electrode formed on each liquid crystal cell.

In a process for manufacturing LCD panels, a plurality of thin film transistor array substrates are formed on a large mother substrate and a plurality of color filter substrates are formed on another mother substrate. The two mother substrates are bonded, so that a plurality of LCD panels is formed at the same time to improve yield. A cutting process is used to cut the bonded substrates into unit LCD panels.

Typically, the cutting process to make unit LCD panels includes forming a scribing line at a surface of the mother substrate using a diamond wheel having a hardness greater than that of glass and breaking the substrate along the scribing line by applying a mechanical force thereto. Hereinafter, a LCD panel of the related art will be described with reference to the accompanying drawings.

FIG. 1 is a plan view showing a schematic planar structure of a unit LCD panel of the related art prepared by bonding a thin film transistor array substrate and a color filter substrate of the LCD device to each other.

Referring to FIG. 1, an LCD panel 10 comprises an image display unit 13 having liquid crystal cells arranged in a matrix form, a gate pad unit 14 connected to gate lines of the image display unit 13, and a data pad unit 15 connected to data lines. The gate pad unit 14 and the data pad unit 15 are formed on edge areas of a thin film transistor array substrate 1 that are not overlapped by the color filter substrate 2. The gate pad unit 14 supplies the gate lines of the image display unit 13 with corresponding scan signals supplied from a gate driver integrated circuit, and the data pad unit 15 supplies the data lines with image information supplied from a data driver integrated circuit.

On the thin film transistor array substrate 1 of the image display unit 13, the data lines having the image information applied thereto are arranged to perpendicularly cross the gate lines having the scan signals applied thereto. Thin film transistors are formed at each crossing of the data and gate lines to switch liquid crystal cells. Pixel electrodes are connected to the thin film transistors to drive the liquid crystal cells. A passivation layer is formed on the entire surface of the thin film transistor array substrate 1 to protect the electrodes and the thin film transistors.

In addition, color filters separated by a black matrix for each cell area are formed on the color filter substrate 2 of the pixel display unit 13. A transparent common electrode may be formed on the color filter substrate 2.

A cell gap is provided between the thin film transistor array substrate 1 and the color filter substrate 2, which are bonded to each other by sealant (sealing unit) (not shown) formed at the peripheral regions of the image display unit 13. A liquid crystal layer (not shown) is formed in the space between the thin film transistor array substrate 1 and the color filter substrate 2.

FIG. 2 shows the cross-sectional structure of a first mother substrate having thin film transistor array substrates 1 and a second mother substrate having color filter substrates 2, wherein the first and second mother substrates are bonded to each other to form a plurality of LCD panels.

Referring to FIG. 2, for each unit LCD panel the thin film transistor array substrate 1 is longer than the color filter substrate 2, because the thin film transistor array includes the gate pad unit 14 and the data pad unit 15 as illustrated in FIG. 1 at edges of the thin film transistor array substrate 1 that do not overlap the color filter substrate 2.

Hence, on the second mother substrate 30 the color filter substrates 2 formed thereon are spaced apart from each other by a dummy region 31 corresponding to the protruding area of each thin film transistor array substrate 1 on the first mother substrate 20.

Moreover, the unit LCD panels are arranged to maximize the use of the first and second mother substrates 20 and 30. Although the arrangement depends on the model of the unit LCD panels, the unit LCD panels are typically spaced apart from each other by a distance corresponding to a dimension of another dummy region 32.

After the first mother substrate 20 having the thin film transistor array substrates 1 is bonded to the second mother substrate 30 having the color filter substrates 2, a scribing process and a breaking process are carried out to individually cut the LCD panels.

Typically, the scribing process is implemented by forming scribing lines by use of a cutting wheel, while the breaking process is implemented by cutting the substrate along the scribing lines by use of a steam-cutting device.

FIG. 3 shows a substrate 40 processed by the cutting wheel and a pressing bar of the related art. As shown in FIG. 3, a scribing line 33 is formed on the substrate 40 including a plurality of LCD panels 10 using the cutting wheel. The substrate 40 is cut along the scribing line 33 by pressure of the pressing bar.

However, several problems may occur when cutting the substrate using the cutting wheel and the pressing bar as follows.

In order to separate the LCD panel from the substrate that is completely cut by the pressing bar, the cut dummy substrate is lowered below the cut line by gravity. Accordingly, a separate space is required below the cut line. Additionally dust may be generated when the dummy substrate is lowered. Further, if a substrate is not cut into using the pressing bar, the uncut substrate is transferred to later processes resulting in stopping of the later process.

SUMMARY OF THE INVENTION

Accordingly, the present invention is directed to an apparatus for transferring liquid crystal display panel that substantially obviates one or more of the problems due to limitations and disadvantages of the related art.

An advantage of the present invention is to provide an apparatus for transferring a liquid crystal display (LCD) panel that is capable of completely separating an LCD panel from a substrate by applying pressure onto the substrate that has been processed by a cutting wheel and a steam-cutting device and for transferring the substrate to a later process.

Another advantage of the present invention is to provide an apparatus for transferring a liquid crystal display (LCD) panel that is capable of quickly transferring LCD panels of a variety of models.

Additional features and advantages of the invention will be set forth in the description which follows, and in part will be apparent from the description; or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein a liquid crystal display (LCD) panel includes: a first main body to affix a liquid crystal display (LCD) panel formed on a substrate; and at least one second main body extendable from the first main body to adjust an area to affix the LCD panel; a third main body extendable from the second main body.

In another aspect of the present invention, a liquid crystal display panel transferring apparatus includes: a main body having a variable area to affix a liquid crystal display (LCD) panel formed on a substrate; and at least one pin formed at an edge of the main body to apply an impact onto the substrate at an outer periphery of the LCD panel to thereby separate the LCD panel from the substrate.

In another aspect of the present invention, a method for fabricating a liquid crystal display device includes: bonding first and second substrates to form a plurality of liquid crystal display (LCD) panels; forming a scribing line on the substrate having the plurality of LCD panels; controlling a main body of an LCD panel transferring apparatus according to a size of the LCD panel; affixing the LCD panel using suction holes formed at the main body; and applying an impact onto outer portions of the LCD panel by use of pins formed at outer peripheries of the main body, to thus cut the substrate.

It is to be understood that both the foregoing general description and the following detailed description are exemplary and explanatory and are intended to provide further explanation of the invention as claimed

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIGS. 7A and 7B are views showing an extraction of an LCD panel from a substrate by use of an apparatus for transferring an LCD panel, wherein FIG. 7A is a view showing a transferring of an LCD panel with a smaller area, and FIG. 7B is a view showing a transferring an LCD panel with a greater area.

DETAILED DESCRIPTION OF THE ILLUSTRATED EMBODIMENTS

Reference will now be made in detail to embodiments of the present invention, examples of which are illustrated in the accompanying drawings.

Embodiments of the present invention can be implemented such that the substrate can be cut into by employing apparatus other than the cutting wheel or pressing bar of the related art. In particular, embodiments of the present invention include an apparatus that can be used to cut an LCD panel and to transfer the cut LCD panel. The apparatus may be referred to as a transferring apparatus for transferring the cut LCD panel.

The transferring apparatus may not independently completely cut the substrate. Instead, the transferring apparatus may cut the substrate together with the cutting wheel and the steam cutting device. In other words, the substrate may be nearly completely cut by the cutting wheel and the steam cutting device, but not completely separated as a unit panel. Accordingly, an LCD panel that has not been separated is completely separated from the substrate and simultaneously transferred to the later process.

Embodiments of the present invention provide a transferring apparatus applicable to LCD devices of various models. The LCD devices may be adapted to various electronic equipment such as mobile communication devices, notebook computers, and TV sets. LCD devices for the notebook computers or the TV sets may be fabricated to have various screen sizes. Using the transferring apparatus, a processing line capable of fabricating LCD devices with various models (sizes) at a low fabrication cost may be implemented. The embodiments of the present invention include a transferring apparatus that can accommodate various models by allowing the size of a main body onto which an LCD panel is affixed to be adjustable (variable).

An embodiment of a transferring apparatus according to the present invention is described in detail hereinafter with reference to the attached drawings.

Figure 1:
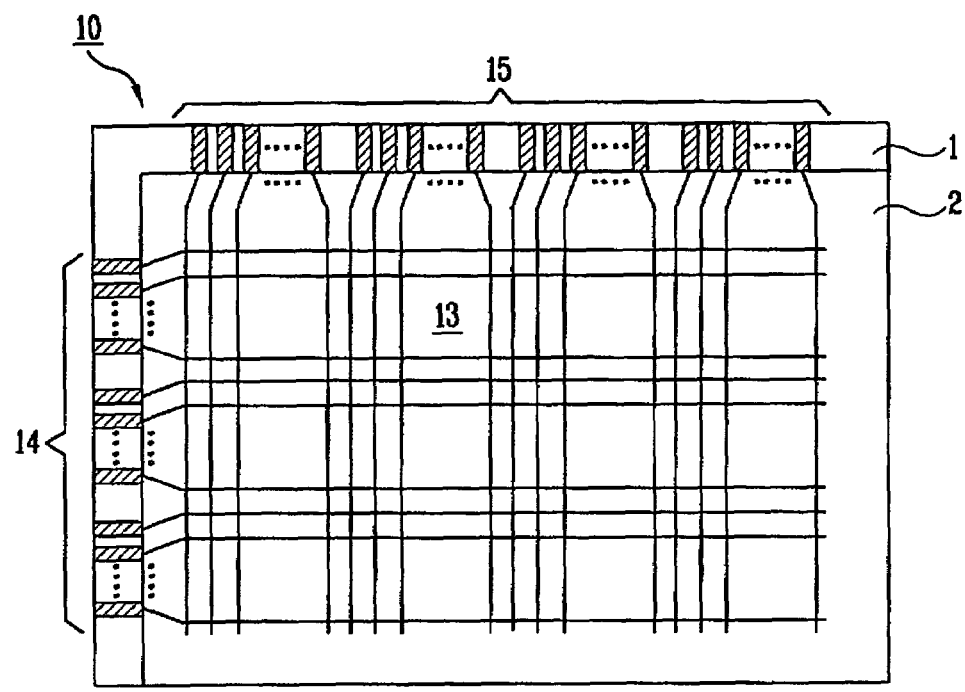
FIG. 1 is a plan view showing a structure of a typical LCD panel of the related art.
Figure 2:
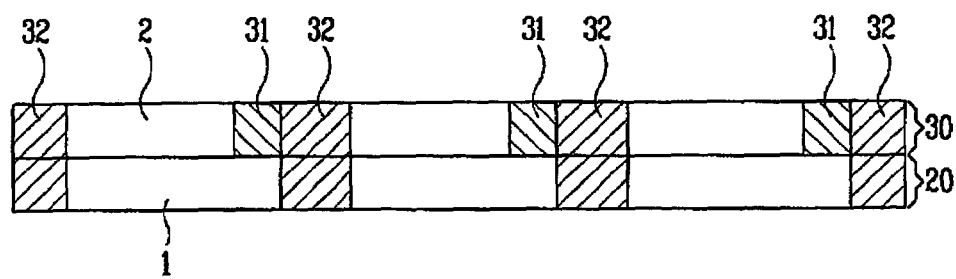
FIG. 2 is a sectional view showing a substrate on which a plurality of LCD panels are formed.
Figure 3:
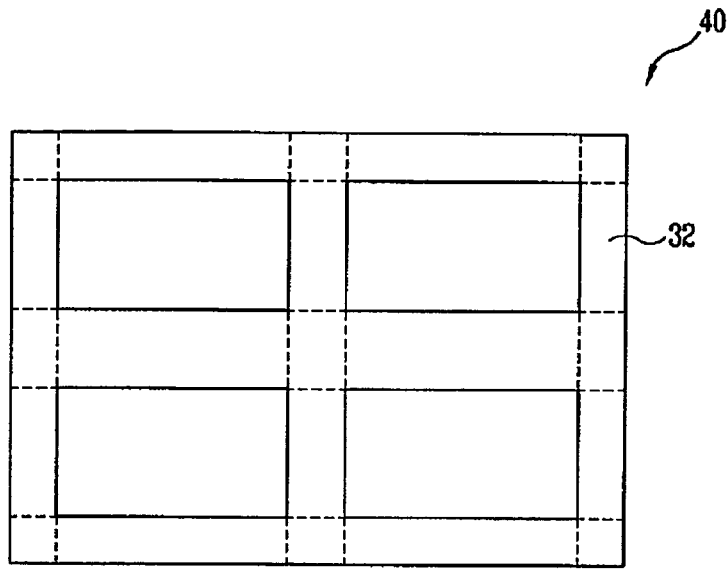
FIG. 3 is a plan view showing a substrate on which cutting lines are formed via a scribing process and a breaking process.
Figure 4:
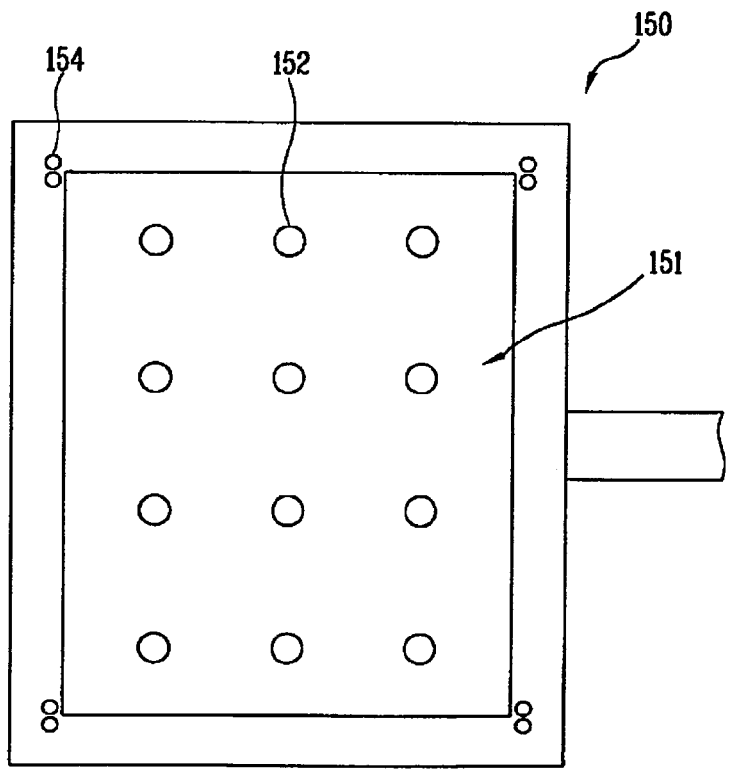
FIG. 4 is a view showing a structure of an apparatus for transferring an LCD panel in accordance with an embodiment of the present invention.

FIG. 4 is a view showing a LCD panel transferring apparatus according to an embodiment of the present invention. As shown in FIG. 4, a transferring apparatus 150 may include a main body 151; a plurality of suction holes 152 formed on the main body 151 for affixing the LCD panel 110; and pins 154 formed at corners of the main body 151. The transferring apparatus 150 is used to separate completely the LCD panel 110 from the substrate 140 and simultaneously to transfer the separated LCD panel 110 to the next process. The pin 154 presses a dummy region to completely separate the LCD panel 110 from the substrate 140 and a suction applied through the suction holes 152 affixes the separated LCD panel 110 to transfer it to the next process.

Figure 5:
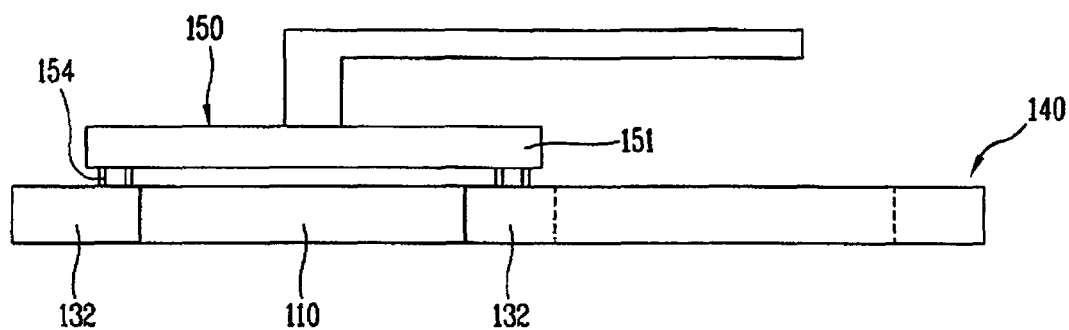
FIG. 5 is a view showing an extraction of an LCD panel from a substrate by use of an apparatus for transferring an LCD panel.

Referring to FIG. 5, after the substrate 140 has undergone the scribing process and the breaking process the transferring apparatus 150 is moved to a set position above the substrate 140 (i.e., a position where the LCD panel 110 is formed) and is then lowered. The LCD panel 110 is affixed to the main body 151 by applying a vacuum through the suction holes 152 formed at the main body 151. An alignment mark may be formed in the dummy region 122 to align the substrate 140 and the transferring apparatus 150. With the LCD panel 110 affixed to the main body 151 the pins 154 can be moved downwardly from the main body 151 to apply pressure to a dummy region 132 of the substrate 140 to completely separate the LCD panel 110 from the substrate 140. When the transferring apparatus 150 is then moved upwardly, the separated LCD panel 110 remains affixed to the main body 151 and is moved upwardly for transfer to a later process.

Thus, using the apparatus described with reference to FIGS. 4 and 5, the substrate 140 may be cut using the cutting wheel, the steam cutting device and using the transferring apparatus 150, the LCD panel 110 may be completely separated from the substrate 140. The transferring apparatus 150 may be further used to transfer the LCD panel 110 to the next process. Accordingly, the separated LCD panel 110 may be quickly transferred and a separate space for collecting the dummy substrate may not be required. In addition, even when the LCD panel 110 is not completely separated from the substrate 140 (i.e., even when the substrate is defectively cut), the cutting process can continue without stopping the cutting line itself.

Figure 6:
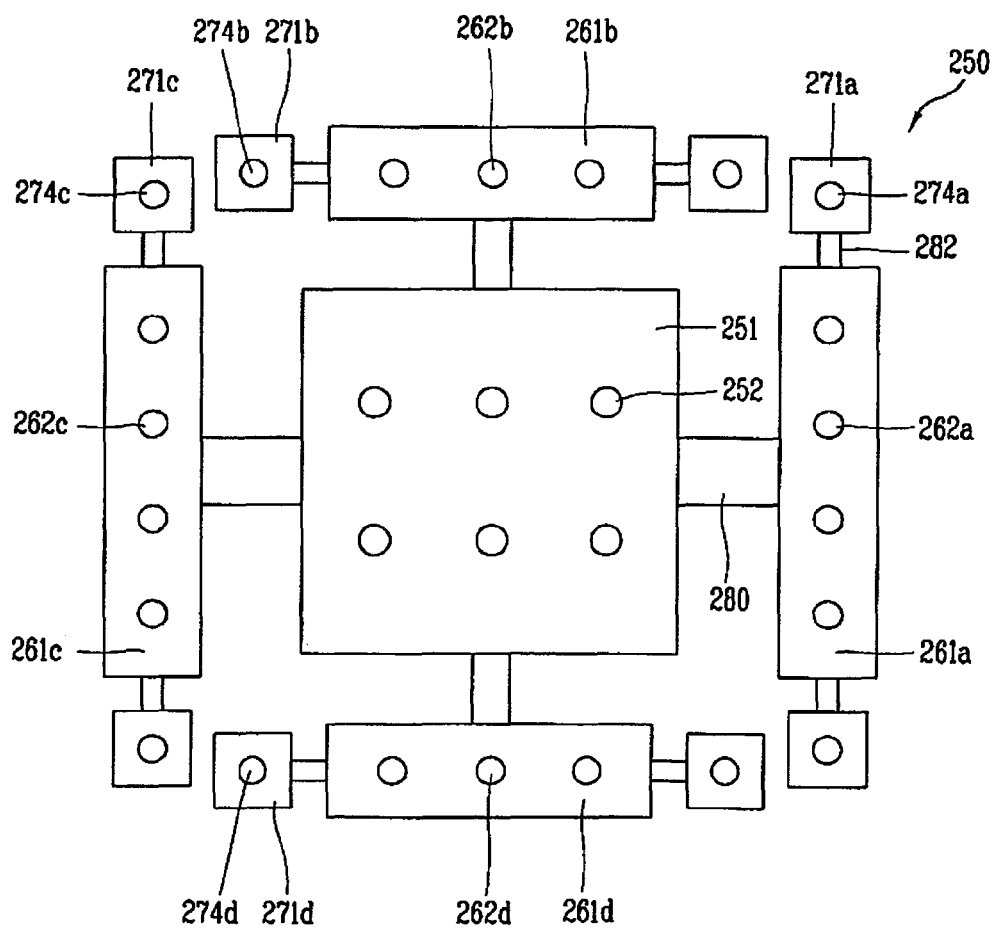
FIG. 6 is a view showing a structure of an apparatus for transferring an LCD panel in accordance with another embodiment of the present invention.

FIG. 6 is a view showing an LCD panel transferring apparatus 250 according to another embodiment of the present invention.

The transferring apparatus 250 according to the embodiment illustrated in FIG. 6, includes a first main body 251 for affixing and transferring an LCD panel; a plurality of first suction holes 252 formed at the first main body 251 and connected to a vacuum device to thus affix the LCD panel; a plurality of second main bodies 261a through 261d which are separated from the first main body 251 and then connected to the first main body 251 via first extension bars 280.

The second main bodies 261a through 261d having second suction holes 262a through 262d may be extended from the main body along the first extension bars to increase the fixation area of the LCD panel. The second main bodies may further include third main bodies 271a through 271d extendable from the second main bodies 261a through 261d via second extension bars 282, and pins 274a through 274d formed at the third main bodies 271a through 271d, for completely separating the LCD panel from the substrate by impacting or striking the substrate.

Figure 7A:
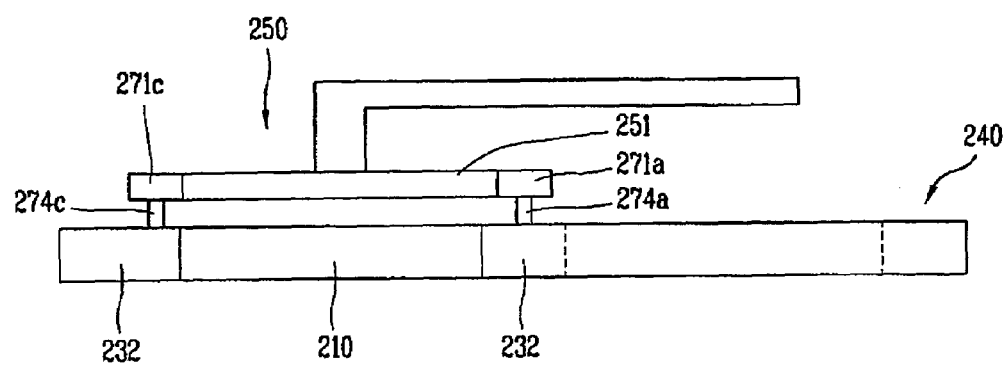
Figure 7B:
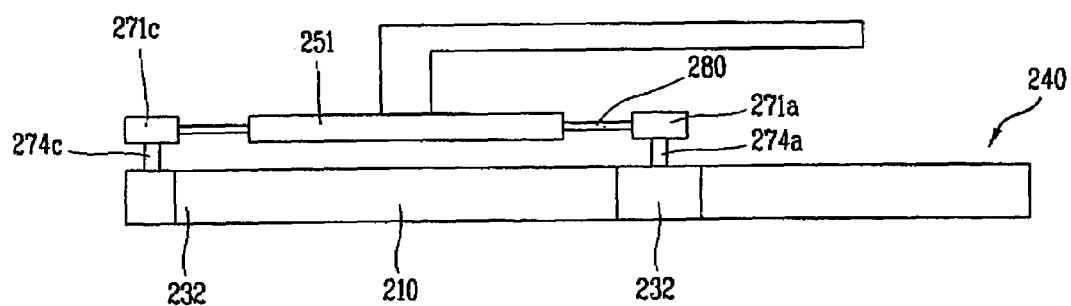

An operation of the LCD panel transferring apparatus 250 according to the embodiment of the present invention illustrated in FIG. 6 will now be explained with reference to FIGS. 7A and 7B. FIG. 7A is a view showing a transfer of an LCD panel with a relatively smaller area, and FIG. 7B is a view showing a transfer of an LCD panel with a relatively greater area.

As shown in FIG. 7A, when a substrate 240 including an LCD panel 210 having a relatively small area is transferred through a conveyer via a scribing process and a breaking process the transferring apparatus 250 is moved to a region of the LCD panel 210 above the substrate 240. The transferring apparatus 250 descends and a the vacuum device connected to the first suction holes 252 is operated with the first main body 251 of the transferring apparatus 250 contacting the LCD panel 210. The LCD panel 210 is affixed to the first main body 251 by application of suction through the first suction holes 252 to the substrate 240.

The first extension bars 280 and the second extension bars 282 which respectively extend the second bodies 261a through 261d and the third main bodies 271a through 271d away from the first main body 251 are in a retracted position and accordingly, the second bodies 261a through 261d and the third main bodies 271a through 271d are in contact with or in close proximity to the first main body 251.

The LCD panel 210 is affixed to the first main body 251 via the first suction hole 252. The LCD panel may be additional affixed using the second suction holes 262a through 262d. The pins 274a through 274d descend from the third main body 271a through 271d to apply an impact on the dummy regions 232 of the substrate 240. The applied impact completely separates the LCD panel 210 from the substrate 240. The separated LCD panel 210 may then be transferred to a later process by the transferring apparatus 250.

As shown in FIG. 7B, when the substrate 240 including an LCD panel with a relatively great area (i.e., an LCD panel greater than the first main body of the transferring apparatus 250) is transferred through the conveyer via the scribing process and the breaking process, the transferring apparatus 250 is moved to the region of the LCD panel 210 above the substrate 240.

Since the area of the LCD panel 210 is greater than that of the first main body 251 of the transferring apparatus 250, the second bodies 261a through 261d and the third main bodies 271a through 271d are extended away from first main body 251 using the first extension bars 280 and the second extension bars 282. The center and four edges of the LCD panel 210 are affixed to the first main body 251 and the second main bodies 261a through 261d by the first suction holes 252 and the second suction holes 262a through 262d respectively formed at the first main body 251 and the second main bodies 261a through 261d.

With the LCD panel affixed to When the pins 274a through 274d of the third main bodies 271a through 271d which are extended from the second main bodies 261a through 261d descent in the state that the LCD panel is affixed to thus apply an impact onto the dummy regions 232 of the substrate 240, the LCD panel 210 is completely separated from the substrate 240 to then be transferred to the later process.

As described above, regarding the LCD panel transferring apparatus 250 according to the embodiment of the present invention illustrated in FIG. 6, the second main bodies 261a through 261d and the third main bodies 271a through 271d can be extended from the first main body 251 to affix the LCD panel with the greater area to transfer it. In particular, the second main bodies 261a through 261d and the third main bodies 271a through 271d are extended by use of the first and second extension bars 280 and 282, extended distances of which are adjustable. Accordingly, it is possible to vary the area of the LCD panel to be suction-affixed by the first main body 251, the second main bodies 261a through 261d and the third main bodies 271a through 271d.

When the suction area of the main body of the transferring apparatus 250 is fixed (i.e., when the area of the main body is not variable), when changing a model of the LCD panel being processed, the main body is detached from the transferring apparatus and then another main body corresponding to the changed model is attached to the transferring apparatus to thus execute the transferring operation, which causes the processes to be executed with delay and also increases the price of the transferring apparatus. However because the area of the main body is adjustable as in the described embodiments, replacing the main body to accommodate different models of the LCD panels may be avoided allows an increased process performance. In particular, the transferring apparatus in these embodiments can efficiently be used in a processing line for fabricating various models of LCD panels.

As described above, the LCD panel transferring apparatus may be constructed to have a controllable affixing portion. Accordingly, upon changing a model of an LCD device, the suction-affixing area of the transferring apparatus may be adjusted to effectively accommodate to LCD devices with various models to allow a fast transfer of the LCD panel.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display panel transferring apparatus comprising:

a main body having a first main body, at least one second main body, and at least one extension bar to be attached to the first main body and the second main body, the extension bar being extended from the first main body to an outer portion of the main body so that the area of the main body is variable according to the area of a liquid crystal display (LCD) panel formed on a substrate to affix the separated LCD panel having various area; and at least one pin formed in an inner portion at an edge of the main body to apply an impact onto the substrate at an outer periphery of the LCD panel to thereby separate the LCD panel from the substrate, wherein the area of the main body is varied in the planar direction of the LCD panel and the variable area of the main body is coplanar so that the liquid crystal display panel is contacted with the upper surface of the main body, wherein the separated LCD panel is affixed to the varied area of the main body.

2. The apparatus of claim 1, further comprising a plurality of holes formed at the main body to affix the LCD panel.

3. The apparatus of claim 1, further comprising a third main body extendable from at least one second main body.

4. The apparatus of claim 3, further comprising a second extension bar to extend the third main body from at least one second main body.

5. The apparatus of claim 3, wherein the pin is formed at the third main body.

* * * * *